Nov. 24, 1953

P. R. AIGRAIN 2,660,618

SIGNAL TRANSLATION SYSTEM

Filed Jan. 20, 1948

INVENTOR.
PIERRE R. AIGRAIN

BY

ATTORNEY

Patented Nov. 24, 1953

2,660,618

UNITED STATES PATENT OFFICE 2,660,618

SIGNAL TRANSLATION SYSTEM

Pierre R. Aigrain, New York, N. Y., assignor to International Standard Electric Corporation, New York, N. Y., a corporation of Delaware Application January 20, 1948, Serial No. 3,230

8 Claims. (Cl. 179—15)

This invention relates to electrical signal translators, and more particularly to a system for translating a signal into a binary code suitable for use with coded modulation systems.

In United States Patent No. 2,272,070 issued to A. H. Reeves and assigned to the International Standard Electric Corporation, a system of communication is disclosed and claimed in which the amplitude of the signal to be transmitted is scanned at periodic intervals, the signal amplitude obtained at each of said periodic intervals is quantized, and a binary code group representative of the scanned and quantized amplitude is then transmitted. In addition to the original coder described by Reeves, a number of coders have been described in the recent literature (Bell System Technical Journal, July 1947; Electronics, December 1947; Electrical Engineering, November 1947).

In the coding process it is required to establish a correspondence between voltage levels and pulse combinations. Although this correspondence could be arbitrary, considerations of signal-to-noise ratio and simplicity of decoding has in practice restricted the choice to binary coding, in which the pulse combination can be considered as the first digits of the binary expansion of the voltage amplitude.

Binary coders may be classified into two broad categories. Those in the first group may be called "non-linear" coders. In these the input voltage is fed into $p$ non-linear circuits (for $2p$ levels). The output of each of these circuits will be positive or not according to whether the corresponding digit of the code is 1 or 0. The Reeves original coder is of this type, and so is the coding tube described in the December 1947 issue of Electronics magazine. The main drawback of these coders is the possibility of "skip-jumping." For example, if the input signal is on the line of demarkation between the levels 15 (01111) and 16 (10000), it may in practice happen that the code produced will be a combination of the two, thus yielding 11111, or 31. Skip-jumping can be eliminated by accurately quantizing the signal prior to applying it to the coding device, but this complicates the coder. The main advantage of non-linear coders is precisely their simplicity.

Coders in the second category may be designated "subtraction" coders. These coders require that each digit depend not only on the signal input but also on the preceding digit. Such a coder has been described by Goodall (Bell System Technical Journal, July 1947). In general the subtraction coders heretofore proposed have been more complicated than the non-linear coders.

It is accordingly a primary object of this invention to provide a method for utilizing non-linear coders in such a way to produce a binary code free from skip-jumping.

It is also an object of the invention to provide a simplified system for translating a signal into the customary binary code.

In accordance with a feature of the invention, non-linear coders are utilized in such a way as to produce a predetermined code inherently free of skip-jumping, and said predetermined code is then translated to a binary code.

In accordance with another feature of the invention, a general system is provided for producing a predetermined code which can easily be translated into a binary code by means of simple circuits.

In accordance with a further feature of the invention, a system is provided for producing from a given input signal an intermediate code such that adjacent levels in the code differ by the character of one digit only, and said intermediate code is then applied to a scale-of-two circuit to produce the required binary code.

The above mentioned and other features and objects of the invention and the manner of attaining them will become more apparent and the invention itself will be best understood by reference to the following description of an embodiment of the invention taken in conjunction with the accompanying drawings wherein.

Figures 1, 2, 3, 4, 5, 6:
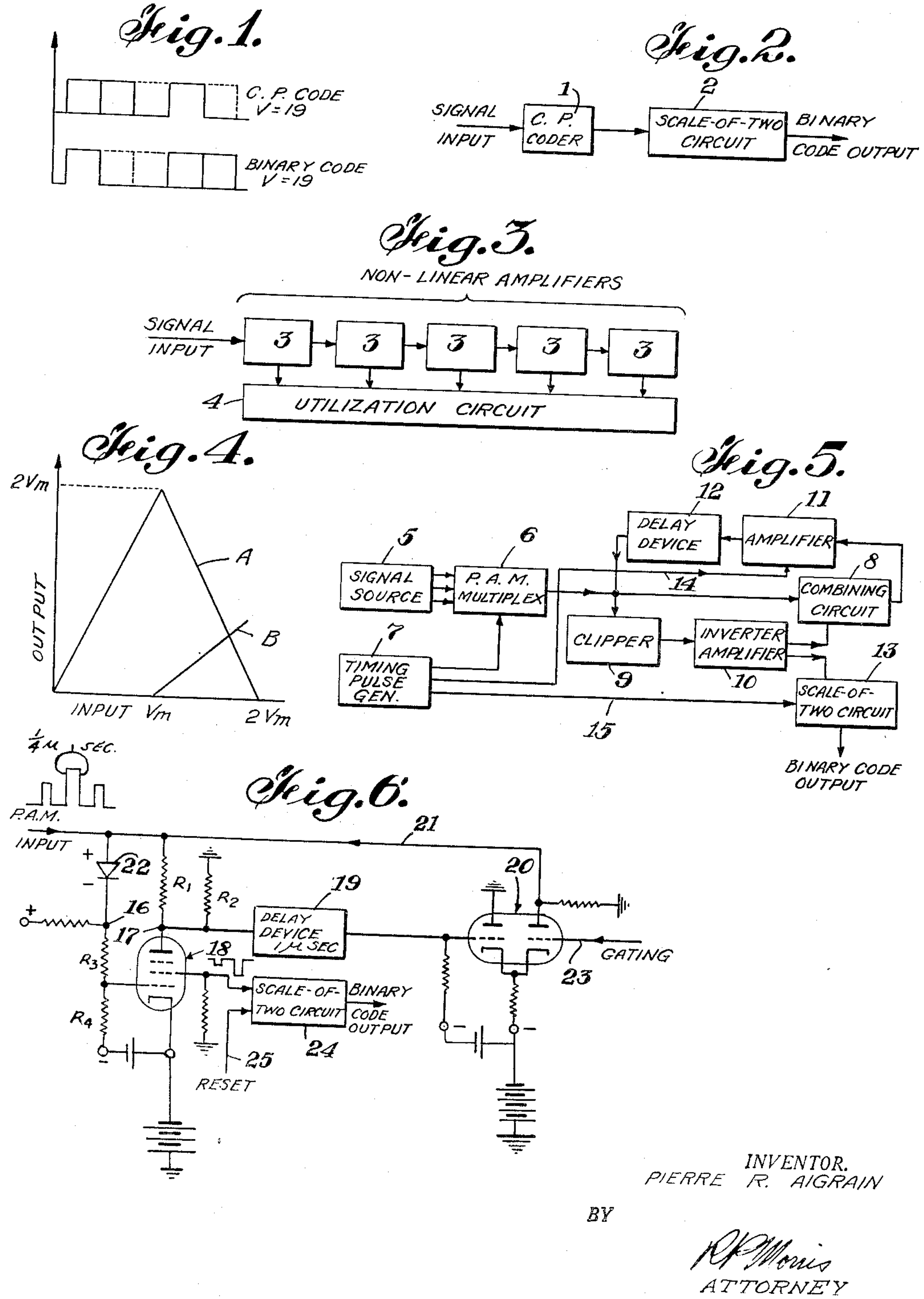
Fig. 1 shows a special code group, and its corresponding representation in binary code.
Fig. 2 is a block diagram of a binary coder free of skip-jumping.
Fig. 3 is a block diagram of a system for producing a required intermediate code.
Fig. 4 shows the characteristics of certain circuits of Fig. 3.
Fig. 5 is a block diagram of a particular system for producing a binary code representative of a given signal.
Fig. 6 shows details of a circuit in accordance with Fig. 5.

Non-linear coders can be designed without extra complication to produce an arbitrary two-digit code representation of a signal, as well as the binary code representation. In order to avoid the difficulties inherent in the use of a non-linear coder adjusted to produce a binary code directly, it appears advantageous to have the non-linear coder produce first a code for which skip-jumping does not exist, and then to convert this intermediate code to the required binary code. In order to eliminate skip-jumping, the intermediate code should be such that adjacent levels of the code differ by the character of one element only. Such a code may be called a cyclic permutation (CP) code. As an example, a 32 level CP code is given below.

| | | |
|---|---|---|
| 0–00000 | 10–01111 | 21–11111 |
| 1–00001 | 11–01110 | 22–11101 |
| 2–00011 | 12–01010 | 23–11100 |
| 3–00010 | 13–01011 | 24–10100 |
| 4–00110 | 14–01001 | 25–10101 |
| 5–00111 | 15–01000 | 26–10111 |
| 6–00101 | 16–11000 | 27–10110 |
| 7–00100 | 17–11001 | 28–10010 |
| 8–01100 | 18–11011 | 29–10011 |
| 9–01101 | 19–11010 | 30–10001 |
| | 20–11110 | 31–10000 |

The above code has also been called the reflected binary code. An analysis of the foregoing tabulation indicates that the reflected binary or cyclic permutation code consists of groups of on-or-off pulses in which the characteristics of said code groups are such that each permissible pulse position in a code pulse group is uniquely correlated with a particular digit of the code, the code value of each "on"-pulse being proportional to $(-1)^s(2^d-1)$ where $d$ is the digit number of the digit with which the pulse position occupied by said "on"-pulse is correlated and S is the number of "on"-pulses in said code pulse group having digit numbers greater than $d$, the code value of each "off"-pulse being zero, the code value of each entire pulse group being the sum of the individual code values of the several pulses of said group.

CP code is not advantageous for transmission, because in some instances it is more difficult to decode than a binary code, and might have to be translated to the corresponding binary code at the receiver prior to decoding. Moreover CP code is more subject to noise on the transmission medium (a noise pulse on the first digit can change the representation for zero into the representation for 31). But it is clear that CP code may easily be produced by a non-linear type coder without any skip-jumping. In accordance with my invention, a CP code such as that listed above can easily be changed over to the normal binary code very simply by feeding the CP code into a scale-of-two circuit. This is illustrated in Fig. 1 for the code corresponding to the 19th level. The CP code representation is 11010.

The condition of a scale-of-two circuit fed by these pulses will be: after the first pulse, "on"; after the second pulse "off"; after the third pulse "off"; after the fourth pulse "on"; after the fifth pulse "on". The scale-of-two circuit fed by the code group 11010, will accordingly produce a corresponding code group 10011. This latter code group is the binary code representation of 19.

Referring now to Fig. 2, I show a general diagram of a non-skip coder. The signal input is fed to a CP coder 1, which may be any class of coder, as for example a non-linear coder. The output of the CP coder 1 is fed to a scale-of-two circuit 2, and the output of the scale-of-two circuit is a binary code representation of the input signal. The CP coder of the apparatus of Fig. 1 may be of any type. In particular, the coding tube hereinbefore referred to is well adapted to this use.

Referring now to Fig. 3, I show in general form a special type of coder which is well adapted to produce the CP code. The coder consists of a cascade of amplifiers each of which has the transfer characteristics of Fig. 4. Each of the nonlinear amplifiers 3 is provided with two outputs. One output corresponds to the curve A of Fig. 4, and is connected to the input of the next amplifier in the cascade. The other output corresponds to the curve B of Fig. 4. There are five such outputs, and these five outputs taken together constitute the code. If one of the outputs corresponding to curve B is positive, the corresponding digit is 1; if not, the corresponding digit is 0. It is apparent that if all the digits of a given code group are to be transmitted simultaneously, suitable shaping circuits for each output will be required. If, on the other hand, the digits of a given code are to be transmitted in time sequence, suitable delay lines may be incorporated within the utilization circuit 4, or between amplifiers 3, and all the outputs may then be fed to a common shaping circuit.

In Fig. 4, the curve A may be represented as follows:

$$V_o=2V_i \text{ for } V_i<V_m$$
$$V_o=2(2V_m-V_i) \text{ for } V_i>V_m$$

where $V_i$ is the input voltage, $V_o$ is the output voltage, and $V_m$ is an intermediate voltage. Curve B is characterized only in that it is zero for $V_i<V_m$ and positive for $V_i>V_m$.

Each amplifier in Fig. 3 accordingly sends out no code element when $V_i<V_m$. It also multiplies the input voltage by two and sends it on to the next amplifier. If, however, the input $V_i$ is greater than $V_m$, the amplifier sends out a code indication to the utilization circuit. It also subtracts the input V from $2V_m$, multiplies the difference by two, and sends the result on to the next amplifier. At the next amplifier this process is repeated.

It can readily be shown that as the signal input is monotonically increased the coded output will change by the character of only one element of the code group at a time.

The apparatus of Fig. 3 can be simplified by using only one amplifier, particularly for the case where the pulses are to be obtained in time sequence. Indeed, all the amplifiers of Fig. 4 are identical. It is thus possible to feed the output corresponding to curve A of Fig. 4 back to the amplifiers input after a proper delay, and the same amplifier will in turn take the place of all the amplifiers of Fig. 3.

Referring now to Fig. 5, I show in more detailed block diagram form a particular circuit based on Fig. 3, in which the output of the amplifier is fed back to its input as explained above in connection with the description of Fig. 3. The output of signal source 5 is translated into amplitude modulated pulses in circuit 6 in synchronism with pulses from timing pulse generator 7. The amplitude modulated pulses from 6 are applied directly to a combining circuit 8 and simultaneously to a clipping circuit 9, which is adjusted to pass only that part of a voltage which is greater than an arbitrary intermediate level $V_m$. The output of circuit 9 is applied to an inverting amplifier 10 adjusted in a manner which will be explained hereinafter. It is apparent that there will be no output from amplifier 10 unless the voltage applied to the clipping circuit 9 is greater than the predetermined level $V_m$. The output of amplifier 10 and a portion of the original amplitude modulated pulse input, are then added in combining circuit 8. The output of combining circuit 8 is then applied to amplifier 11. The output of inverting amplifier 10 is adjusted to increase in absolute magnitude at a rate twice as great as the portion of the amplitude modulated pulse which is applied to combining circuit 8, so that when clipping circuit 3 passes voltage, the output of the combining circuit will have a characteristic with a negative slope with respect to the input amplitude modulated pulses.

The output of amplifier 11 is applied via a suitable delay device 12 back to the input of the system, where the operation is repeated. The delay of delay device 12 is arranged to be greater than the duration of the input amplitude modulated pulse. After the required number of cycles corresponding to the number of elements in the code group has been completed, amplifier 11 is gated off for a period of time greater than the delay of the system, to prepare the system for the next input amplitude modulated pulse. It is apparent that this system as described constitutes an amplifier having the characteristic given by curve A of Fig. 4. Similarly, it is clear that the output of amplifier 10 has the characteristic given by curve B of Fig. 4. The output of inverting amplifier 10 accordingly represents the required CP code. This output is applied to a scale-of-two circuit 13 out of which finally comes the desired binary code representation of the input amplitude modulated pulse.

In order to avoid oscillation, it is desirable to gate amplifier 11 on for a short period of time in synchronism with the input amplitude modulated pulse at intervals equal to the delay of delay device 12. After each code group is completed, amplifier 11 is gated off for a period of time greater than the delay of the system. These pulses are obtained from timing pulse generator 7, and are applied via line 14. The scale-of-two circuit is simultaneously reset by a pulse from timing pulse generator 7, applied via line 15.

I refer now to Fig. 6 in which I show a detailed circuit according to Fig. 5, and in connection with which I give details of suitable pulse widths, delays, and gating pulses. The input consists of amplitude modulated pulse one-fourth of a microsecond wide, and having a spacing of seven microseconds. These pulses are obtained from a suitable signal or signals in accordance with known methods, and they may constitute a time-division multiplex of a plurality of signals. The pulses are adjusted to have an input amplitude of from zero to 96 volts in 3 volt steps. The voltage on point 16 is normally maintained at 48 volts, so that if the input voltage is less than 48 volts the voltage on point 17 is simply equal to $$V_i\frac{R_2}{R_1+R_2}$$

where $V_i$ is the input voltage. When the input exceeds 48 volts, the grid voltage of the tube 18 becomes $$(V_i-48)\frac{R_4}{R_3+R_4}$$

and the plate voltage at point 17 becomes:

$$V_i\frac{R_2}{R_1+R_2}-(V_i-48)\frac{R_4}{R_3+R_4}R_2G_m$$

where $G_m$ is equal to the transconductance of amplifier tube 18.

The resistors $R_1$, $R_2$, $R_3$ and $R_4$ are adjusted in cooperation with $G_m$ in such a way that:

$$\frac{2}{R_1+R_2}=\frac{G_mR_4}{R_3+R_4}$$

The plate voltage at point 17 thus becomes:

$$\frac{R_2}{R_1+R_2}(96-V_i)$$

After a one microsecond delay in the delay device 19, this voltage is amplified by amplifier tube 20, without phase reversal. The amplification is adjusted to be such that the resultant output voltage on line 21 is given by curve A of Fig. 3, where $V_m=48$.

A small resistor in the screen circuit of amplifier 18 makes it possible to recognise whether diode 22 conducts or not. The pulses thus obtained at point 23 are fed to a scale-of-two circuit 24, the output of which is a binary code representation of the input pulse.

Gating pulses obtained in known manner from a suitable timing control circuit are applied to amplifier tube 20 for short (one quarter microsecond) periods of time at intervals of one microsecond. The feedback in the system is thus nonpermanent. After a period of five microseconds, corresponding to a five-element code, tube 20 is gated off for two microseconds by gating pulses applied to line 23, so as to stop the cycle and prepare the coder for the next input pulse. Simultaneously, the scale-of-two circuit 24 is reset via line 25 in known manner.

While I have described above the principles of my invention in connection with specific apparatus, it is to be clearly understood that this description is made only by way of example and not as a limitation to the scope of my invention.

I claim:

1. The method of transmitting binary code representative of a given signal voltage, comprising producing at a transmitter a cyclic permutation code representative of said signal voltage, translating said cyclic permutation code to said conventional binary code before transmitting, and transmitting the conventional binary code.

2. A transmitter for transmitting a conventional binary code representative of a given signal voltage, comprising means for producing a cyclic permutation code in response to said signal voltage, means at said transmitter responsive to said cyclic permutation code to produce said binary code before transmission, and means for transmitting said binary code.

3. A system for producing a cyclic permutation code representative of a given signal voltage, comprising a plurality of amplifiers each having a first output with a triangular response characteristic and a second output with a threshold response characteristic, means for applying said signal voltage to the first of said amplifiers, means for applying said first output of each of said amplifiers to the input of the succeeding one of said amplifiers to form a cascade, a utilization circuit, and means for coupling each of said second outputs to said utilization circuit.

4. A system for producing a cyclic permutation code representative of a given signal voltage, comprising a plurality of amplifiers each having a first output and a second output, wherein said first output is given substantially by $V_o=2V_i$ for $V_i<V_m$, and by $V_o=2(2V_m-V_i)$ for $V_i>V_m$ where $V_i$ is the voltage applied to the input of each of said amplifiers, $V_m$ is a predetermined voltage, and $V_o$ is the output voltage of the amplifier, and wherein said second output is substantially zero for $V_i<V_m$ and is greater than zero for $V_i>V_m$; means for applying said signal voltage to the input of the first of said amplifiers, means for coupling said first output of each of said amplifiers to the input of the succeeding one of said amplifiers to form a cascade, a utilization circuit, and means for applying said second outputs to said utilization circuit.

5. A system for producing a cyclic permutation code representative of a given amplitude modulated pulse, comprising an input circuit for said pulse, means associated with said input circuit for applying said pulse to a first amplifier adjusted to respond to voltages greater than a predetermined value only, a combining circuit for combining at least a part of said pulse with the output of said first amplifier, means for applying the output of said combining circuit to a second amplifier, a delay device, means for applying the output of said second amplifier to said delay device, means for applying the output of said delay device to said input circuit, apparatus responsive to an output of said first amplifier for producing an indication when said first amplifier conducts and a utilization circuit for thet output of said apparatus.

6. A system according to claim 5 further comprising means for gating said second amplifier at intervals substantially equal to the delay of said delay device.

7. A system according to claim 5, wherein said first amplifier is biassed to a linear portion of its characteristics and includes within its input circuit a rectifier, and means for biassing said rectifier to conduct only for signal voltages greater than said predetermined value.

8. A system for producing a cyclic permutation binary code representative of a given amplitude modulated pulse, comprising an input circuit for said pulse, means associated with said input circuit for applying said pulse to an amplifier adjusted to respond to voltages greater than a predetermined value only, a combining circuit for combining at least a part of said pulse with the output of said amplifier, means for applying the output of said combining circuit to a delay device, a second amplifier, means for applying the output of said delay device to said second amplifier, means for applying the output of said second amplifier to said input circuit, and apparatus responsive to an output of said first named amplifier for producing an indication when said first named amplifier conducts.

PIERRE R. AIGRAIN.

References Cited in the file of this patent

UNITED STATES PATENTS

| Number | Name | Date |
|---|---|---|
| 2,132,213 | Locke | Oct. 4, 1938 |
| 2,207,744 | Larson | July 16, 1940 |
| 2,272,070 | Reeves | Feb. 3, 1942 |
| 2,438,908 | Goodall | Apr. 6, 1948 |

FOREIGN PATENTS

| Number | Country | Date |
|---|---|---|
| 344,444 | Great Britain | Feb. 27, 1931 |